United States Patent [19]

Taylor

[11] 4,381,565
[45] Apr. 26, 1983

[54] RADIATIVE REMOVAL OF LOWER LASER LEVEL BOTTLENECKING

[75] Inventor: Lyle H. Taylor, Murrysville, Pa.

[73] Assignee: Westinghouse Electric Corp., Pittsburgh, Pa.

[21] Appl. No.: 210,436

[22] Filed: Nov. 25, 1980

[51] Int. Cl.³ .............................................. H01S 3/09
[52] U.S. Cl. ................................................. 372/91
[58] Field of Search ................................. 372/91, 70

[56] References Cited

U.S. PATENT DOCUMENTS

| | | | |
|---|---|---|---|
| 4,004,250 | 1/1977 | Krupke | 372/91 |
| 4,249,139 | 2/1981 | McAllister | 372/91 |
| 4,276,517 | 6/1981 | McAllister | 372/91 |

*Primary Examiner*—James W. Davie
*Attorney, Agent, or Firm*—M. P. Lynch

[57] ABSTRACT

Stimulated emission resulting from a secondary source of radiation transfers population from a lower laser level of a primary lasing transition to a third energy level which is not involved in the primary lasing of a laser system to reduce lower laser level bottlenecking.

5 Claims, 4 Drawing Figures

RADIATIVE REMOVAL OF LOWER LASER LEVEL BOTTLENECKING

BACKGROUND OF THE INVENTION

The lasing action of a laser apparatus is normally terminated when;
1. The specific laser application requirements are satisfied;
2. The upper laser level is depleted; or
3. The lower laser level becomes so highly populated that the population inversion necessary for lasing is lost.

While the laser termination of item 1 above is by design, the latter two represent fundamental limitations on laser performance. The third condition for laser termination described above is referred to as lower laser level bottlenecking.

The undesirable bottlenecking condition is generally minimized by using laser compositions, pressures and temperatures which maximize the collisional relaxation of the population from the lower laser level, while minimizing the collisional relaxation of the population from the upper laser level.

SUMMARY OF THE INVENTION

The invention described herein employs stimulated emission to transfer a portion of the lower laser level population to a third energy level which is not involved in the primary lasing. This secondary stimulated emission is achieved by applying radiation from an external source which: (1) has sufficient intensity to effectively depopulate the lower laser level, (2) has the proper wavelength for the stimulated emission transition, (3) is applied at the proper time during the primary lasing, and (4) transverses the same laser medium volume transversed by the primary lasing radiation. In addition to these requirements, additional requirements such as: (1) high gain operation on the primary lasing transition, and (2) an appropriate combination of laser medium composition, pressure, and temperature may be desirable in some lasers to increase the efficiency of the secondary stimulated emission transition.

The first two requirements are the usual requirements for stimulated emission whereas the next two assure that the secondary stimulated emission occurs at the proper time and in the proper volume to affect the primary stimulated emission. The additional two requirements reduce the effect of laser level bottlenecking in the lower laser level for the secondary stimulated emission transition. The latter two requirements are needed only when that particular bottlenecking is a problem and will not be needed for many laser systems.

DESCRIPTION OF THE DRAWINGS

The invention will become more readily apparent from the following exemplary description in connection with the accompanying drawings.

DESCRIPTION OF THE PREFERRED EMBODIMENTS

While the novel techniques described above are applicable in general to any laser oscillator or amplifier, the technique will be typically described herein as applied to a conventional 10.6 $\mu$m $CO_2$ gas laser amplifier where the secondary radiation source is a 14 $\mu$m laser beam from a 14 $\mu$m $CO_2$ bending mode laser oscillator. This latter oscillator is a two band oscillator and, for convenience, the 10.6 $\mu$m primary lasing radiation is also taken from the 14 $\mu$m $CO_2$ bending mode oscillator.

Figure 1:
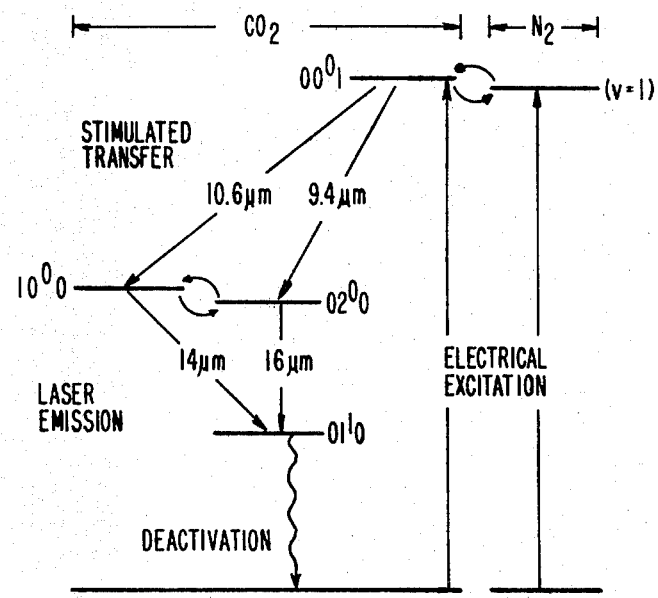
FIG. 1 is an energy diagram of a conventional $CO_2$ two band laser.

The vibrational energy level diagram for this laser is illustrated in FIG. 1 with the three levels corresponding to an upper laser level of $00^01$, an intermediate level of $10^00$, and a lower level of $01^10$. The major interactions of the 16 $\mu$m $CO_2$ bending mode laser are also illustrated in FIG. 1. A detailed description of the operation of this laser is provided in U.S. Pat. No. 4,168,474 which is assigned to the assignee of the present invention and incorporated herein by reference.

Figure 2:
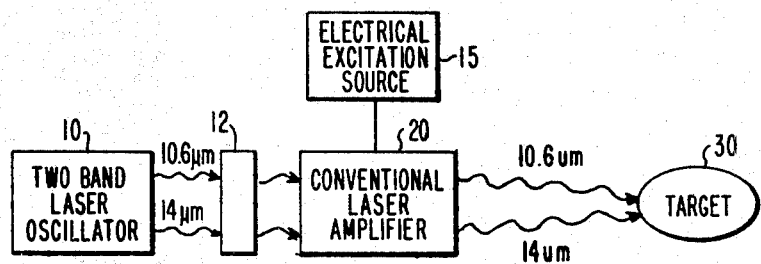
FIG. 2 is a block diagram schematic illustration of the use of a two band laser oscillator as a source of stimulated emission for a conventional laser amplifier to reduce the negative effect of bottlenecking in the operation of the laser amplifier.

A possible embodiment is shown in FIG. 2. The laser medium in the amplifier 20 consists of a gas composition including a lasing gas $CO_2$, an energizing gas $N_2$, and a buffer gas He. The laser medium is electrically excited by a discharge pulse from an electrical excitation source 15. The $00^01$ level of $CO_2$ and the vibrational states of $N_2$ are preferentially pumped by the electrical discharge. After the discharge pulse, the excited $N_2$ transfers much of its excitation energy to the upper $CO_2$ laser level $00^01$, via vibrational-vibrational collisions, while the intermediate laser level, $10^00$, and the lower laser level, $01^10$, lose much of their excitation energy by vibrational-translational collisions with the He atoms in the laser gas mixture.

These energy transfers result in the long lived population inversion on the 10.6 $\mu$m laser transition $00^01 \rightarrow 10^00$. The excess population of the $00^01$ level is then transferred to the $10^00$ laser level by stimulated emission caused by the externally delivered 10.6 $\mu$m laser pulse from the two band laser oscillator 10. During this population transfer a population inversion will be set up between the $10^00$ and $01^10$ levels. At this time the external 14 $\mu$m laser pulse is delivered by the two band oscillator 10. This 14 $\mu$m pulse then transfers population from the $10^00$ level to the $01^10$ level by stimulated emission. This population transfer reduces the $10^00$ level population, thereby increasing the population inversion for the 10.6 $\mu$m stimulated emission which in turn gives more 10.6 $\mu$m lasing than would be possible if the 14 $\mu$m radiation were not present. This enhanced lasing at 10.6 $\mu$m is the objective of this invention as applied to this particular embodiment.

The effects of rotational relaxation and vibrational relaxation may also act in the same manner as the 14 $\mu$m stimulated emission, that is, they may act to increase the population inversion for the 10.6 $\mu$m stimulated emission by reducing the population of the rotational level involved in the lasing in the $10^00$ vibrational level. However, rotation and vibrational relaxation processes are relatively slow compared to stimulated emission processes and are ineffective in short pulse lasers where there is not sufficient time for collisional processes to influence the lasing.

As shown in FIG. 2, the enhanced 10.6 μm laser beam can be focused onto a target 30 such as an inertial confinement fusion target. Furthermore, the accompanying 14 μm laser beam may, if desirable, also be focused onto the target 30. If the 14 μm laser beam is of no use, it may simply be absorbed by a filter (not shown) which transmits the 10.6 μm laser beam.

For this disclosed technique to work effectively, the 14 μm input pulse must be sufficiently intense to significantly affect the 10.6 μm lasing efficiency. Under ideal conditions (no optical losses and no changes in the laser level populations except by stimulated emission) there should be one 14 μm photon for each 10.6 μm photon. The 14 μm pulse must also have the proper wavelength for stimulated emission as clearly shown in FIG. 1. The 14 μm pulse must also be applied at the proper time. In the sample embodiment described herein, that means after the population inversion between the $10^00$ and $01^10$ levels has been set up. The 14 μm pulse must also last as long as it is effective. The optics 12 assures that the 14 μm secondary radiation transverse the same volume as the 10.6 μm radiation.

The enhancement of the 10.6 μm radiation is realizable since the 14 μm radiation removes much of the $10^00$ laser population. This enhancement can be quantified by assuming ideal lasing conditions and a negligible initial $10^00$ population:

$$e = \frac{1}{2}(1 - N_{01^10}/N_{00^01}) \tag{1}$$

where e is the energy enhancement, i.e., the output 10.6 μm laser energy when the 14 μm radiation is present relative to the output 10.6 μm laser energy when the 14 μm radiation is not present. This equation shows that He or $H_2$ in the laser medium and/or gas cooling are desirable to reduce the population density, $N_{01^10}$, of the $01^10$ level, and that high energy loading, i.e., high gain laser operation, is desirable to increase the population density, $N_{00^01}$, of the $00^01$ level. Under preferred conditions this energy enhancement could approach 50%.

If the 14 μm energy is useful, its energy should be included in the energy enhancement. In this case the total energy enhancement is given by $$e_t = e + 0.76(N_{00^01} - N_{01^10})/N_{00^01} \tag{2}$$

This expression also demonstrates the advisability of having high $N_{00^01}$ values and low $N_{01^10}$ values. Under optimum conditions the total energy enhancement could approach 126%.

Figure 3:
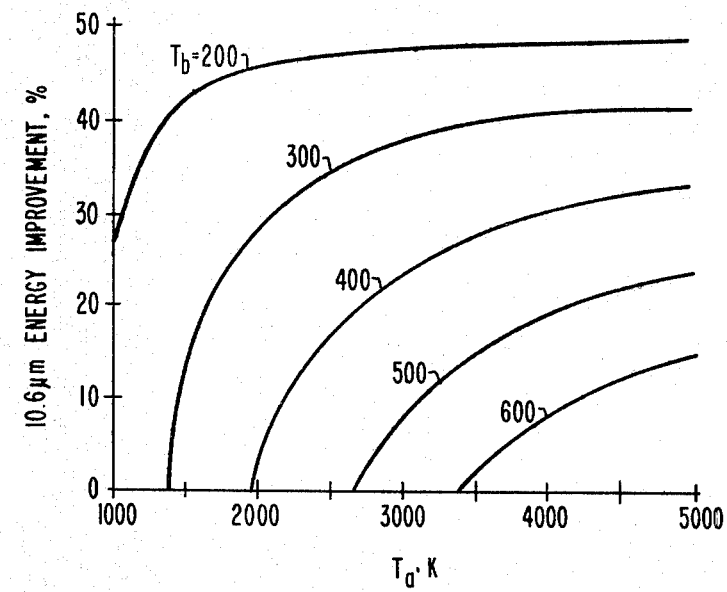
FIG. 3 is a graphical illustration of the enhancement of 10.6 micron energy realized in the inventive embodiment of FIG. 2.
Figure 4:
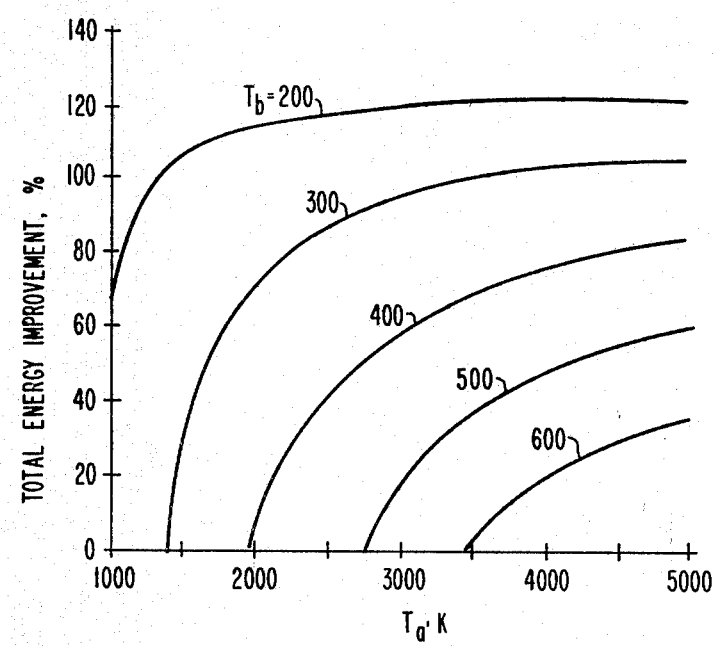
FIG. 4 is a graphical illustration of the enhancement of the total energy output of the laser amplifier in the inventive embodiment of FIG. 2.

Within the vibrational Boltzmann equilibrium temperature approximation commonly used in $CO_2$ laser kinetics models, these energy enhancements can be easily calculated. The results are given in FIGS. 3 and 4 where $T_a$ is the asymmetric stretch mode Boltzmann temperature and $T_b$ is the bending mode Boltzmann temperature. These figures vividly demonstrate that significant energy enhancements are possible with the application of this invention to conventional 10.6 μm $CO_2$ laser amplifiers.

I claim:

1. A method for minimizing lower laser level bottlenecking of the primary lasing transition to improve the performance of a laser system, comprising the step of,
   applying stimulated emission to transfer a portion of the lower laser level population to a third energy level which is not involved in the primary lasing when the lower laser level population is inverted with respect to the population of said third energy level.

2. A method for minimizing lower laser level bottlenecking of the primary lasing transition to improve the performance of a laser system, comprising the steps of,
   applying radiation from a secondary source to said laser system, which secondary radiation exhibits a predetermined wavelength for producing stimulated emission to transfer a portion of the lower laser level population to a third energy level which is not involved in the primary lasing, and
   causing said secondary radiation to traverse essentially the same laser medium volume of said laser system that is traversed by the primary lasing radiation of said laser system.

3. A method as claimed in claim 2 wherein the intensity of said secondary radiation is such that there is approximately one photon of secondary radiation for each photon of primary lasing radiation.

4. A method for minimizing the lower laser level bottlenecking in a 10.6 μm $CO_2$ gas laser amplifier wherein a population inversion between the $00^01$ and $10^01$ levels amplifies the 10.6 μm laser radiation, comprising the steps of,
   applying stimulated emission by using a secondary radiation source to transfer a portion of the population from the $10^01$ level to the $01^10$ level when the population of the $10^00$ level is inverted with respect to the $01^10$ level.

5. In a laser system wherein the primary lasing transition occurs between an upper laser level and a lower laser level, the improvement for minimizing lower laser level bottlenecking to improve the performance of the laser system, said improvement comprising,
   a radiation source for developing secondary radiation for producing stimulated emission to transfer a portion of the lower laser level population to a third energy level which is not involved in the primary lasing transition.

* * * * *